United States Patent
Tang et al.

(10) Patent No.: US 8,976,320 B2
(45) Date of Patent: Mar. 10, 2015

(54) BACKLIGHT MODULE, MANUFACTURE METHOD FOR SUCH BACKLIGHT MODULE, AND LIQUID CRYSTAL DISPLAY DEVICE

(75) Inventors: GuoFu Tang, Guandong (CN); Shih Hsiang Chen, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 390 days.

(21) Appl. No.: 13/521,996

(22) PCT Filed: Jun. 18, 2012

(86) PCT No.: PCT/CN2012/077074
§ 371 (c)(1),
(2), (4) Date: Jul. 12, 2012

(87) PCT Pub. No.: WO2013/185363
PCT Pub. Date: Dec. 19, 2013

(65) Prior Publication Data
US 2013/0335676 A1 Dec. 19, 2013

(30) Foreign Application Priority Data
Jun. 13, 2012 (CN) .......................... 2012 01 0194311

(51) Int. Cl.
*G02F 1/1335* (2006.01)
*F21V 8/00* (2006.01)

(52) U.S. Cl.
CPC ............ *G02B 6/0031* (2013.01); *G02B 6/0091* (2013.01); *G02F 1/133615* (2013.01); *Y10T 29/41* (2013.01)
USPC .......................................... 349/65; 632/631

(58) Field of Classification Search
CPC ................... G02F 1/133615; G02F 1/133603; G02F 1/133611; G02F 2201/46; G02B 6/0073; G02B 6/0091; H05K 2201/10106; F21S 2/005
USPC ..................................... 349/65; 362/612, 631
See application file for complete search history.

(56) References Cited

U.S. PATENT DOCUMENTS

| | | | | |
|---|---|---|---|---|
| 5,788,356 A | * | 8/1998 | Watai et al. | 362/621 |
| 6,219,117 B1 | * | 4/2001 | Nagakubo et al. | 349/65 |
| 2010/0007814 A1 | * | 1/2010 | Kim | 349/58 |
| 2012/0281151 A1 | * | 11/2012 | Abe | 362/611 |
| 2012/0293729 A1 | * | 11/2012 | Yoshikawa | 362/613 |
| 2014/0211505 A1 | * | 7/2014 | Franklin et al. | 362/612 |

FOREIGN PATENT DOCUMENTS

WO WO 2011/096246 * 8/2011

* cited by examiner

*Primary Examiner* — Richard Kim
*Assistant Examiner* — Ryan Crockett
(74) *Attorney, Agent, or Firm* — Andrew C. Cheng

(57) ABSTRACT

A backlight module includes a back frame, a light guide plate disposed in the back frame, a plurality of semiconductor light sources, a plurality of light source circuit boards, and a plurality of attachment members. Part of each of the light source circuit boards is disposed between the back frame and the light guide plate, and the other part of each of the light source circuit boards is exposed outside the side edge of the light guide plate, and each of the semiconductor light sources is disposed on the light source circuit boards which are exposed outside the side edge of the light guide plate. The number of the light source circuit boards, the semiconductor light sources, and the attachment members are all at least two. Besides, an LCD device including the backlight module and a manufacturing method for the backlight module are also disclosed.

13 Claims, 3 Drawing Sheets

BACKLIGHT MODULE, MANUFACTURE METHOD FOR SUCH BACKLIGHT MODULE, AND LIQUID CRYSTAL DISPLAY DEVICE

BACKGROUND OF THE INVENTION

1. Field of the Invention

The present invention relates to the field of LCD (liquid crystal display) technology, and more particularly to a backlight module, a manufacture method for such backlight module, and an LCD device.

2. Description of Related Art

In the liquid crystal display (LCD) device, a thin type backlight module is usually side-light type. For LED light source having luminous directional, the side-light type can subdivided into direct light type (Side View LEDs) and reflective light type (Top View LED). As shown in FIG. 1, FIG. 1 is a part cross-section drawing of a backlight module of the conventional art. The backlight module 100 use light reflective way and comprises a light guide plate 110, a reflective film 120, a LED light source 130, and a LED circuit board 140. The reflective film 120 and the LED light source 130 are disposed on the LED circuit board 140. The light guide plate 110 is disposed on the reflective film 120. The LED light source 130 is disposed at the side edge of the light guide plate 110, and a reflective surface 131 is disposed on the top of the light emitting surface of the LED light source 130.

In practical applications, when the light guide plate 110 and the reflective film 120 are cutting, there will be some cutting tolerance. In this situation, the reflective film 120 may be shorter than the light guide plate 110, showing as part enlarge portion of FIG. 1. The lights emitted by the LED light source 130 and reflected by the reflective surface 131 will pass through the LED circuit board 140 and reflect again from the bottom of the light guide plate 110 and then enter the light guide plate 110. When the backlight module 100 is used for the LCD device, the LCD device will generate bright dots.

To overcome the bright dots problem, the conventional art use a silicon bar to block the lights. Please also refer to FIG. 2, FIG. 2 is a schematic assembly drawing of the LED light sources, LED board, and the silicon bar shown in FIG. 1. Multiple LED light sources 130 are arranged along the direction of the side of the LED circuit board 140. In addition, a silicon bar 150 is also disposed on the LED circuit board 140 and close to the sidewalls of the LED light sources 130. The silicon bar 150 can block the lights entering to the bottom side of the light guide plate 110. However, due to the silicon bar 150 is long and narrow, it is difficult to align the silicon bar 150 with the side edge of the light guide plate 110 when the silicon bar 150 is attached to the LED circuit board 140. When the silicon bar 150 is displaced toward the light guide plate 110, the silicon bar 150 cannot completely block partial lights reflect down from the reflective surface 131. The partial lights are still possible to enter the light guide plate 110 from the bottom side of the light guide plate 110, and the bright dots will still be generated.

SUMMARY OF THE INVENTION

The main technical problem solved by the present invention is to provide a backlight module and a manufacture method for such backlight module, and an LCD device to reduce or avoid the phenomenon of the bright dots generated at the display surface of the LCD device.

Technical solution used to solve these technical problems in the present invention is: to provide a backlight module comprising:

a back frame;
a light guide plate disposed in the back frame;
a plurality of semiconductor light sources;
a plurality of light source circuit boards, wherein part of each of the light source circuit boards is disposed between the back frame and the light guide plate, and the other part of each of the light source circuit boards is exposed outside the side edge of the light guide plate, and each of the semiconductor light sources is disposed on the light source circuit boards which are exposed outside the side edge of the light guide plate, and the lights emitted from the semiconductor light sources are entering the light guide plate at the side surface of the light guide plate; and a plurality of attachment members, wherein the number of the light source circuit boards, the number of the semiconductor light sources, and the number of the attachment members are all at least two, and the at least two attachment members are disposed above the light source circuit boards which are arranged between the semiconductor light sources and the side edge of the light guide plate, and the at least two light source circuit boards, the at least two semiconductor light sources, and the at least two attachment members are arranged along the direction of the side edge of the light guide plate to respectively form a corresponding light source circuit board array, a corresponding semiconductor light source array, and a corresponding attachment member array;

wherein, the number of the light source circuit boards and the number of the attachment members are correspondingly one-to-one, each of the light source circuit boards has one of the attachment members, and the attachment member array and the light source circuit board array have multiple terminals, wherein, two end terminals of the light source circuit board array are aligned with two end terminals of the attachment member array respectively, and the terminals of the attachment member array except the two end terminals are staggered with the corresponding terminals of the light source circuit board array to form a staggered portion, wherein, the terminals of the adjacent two attachment members at the staggered portion is disposed between the adjacent two semiconductor light sources, and the distance between the terminals of the two adjacent attachment members at the staggered portion is less than the package length of each of the semiconductor light sources, and the staggered portion is disposed correspondingly to the sidewall of the semiconductor light source which is adjacent to the terminals of the light source circuit boards.

Wherein, the distance between the two adjacent attachment members at the staggered portion ranges from 0.2 mm to 2 mm.

Wherein, each of the attachment members is a silicon bar, and disposed along the sidewalls of the semiconductor light sources.

Another technical solution used to solve these technical problems in the present invention is: to provide a liquid crystal display device comprising an LCD panel and a backlight module, wherein, the backlight module comprises:

a back frame;
a light guide plate disposed in the back frame;
a plurality of semiconductor light sources;
a plurality of light source circuit boards, wherein part of each of the light source circuit boards is disposed between the back frame and the light guide plate, and the other part of each of the light source circuit boards is exposed outside the side edge of the light guide plate, and each of the semiconductor light sources is disposed on the light source circuit boards which are exposed outside the side edge of the light guide plate, and the lights emitted from the semiconductor light sources are entering the light guide plate at the side surface of the light guide plate; and a plurality of attachment members, wherein the number of the light source circuit boards, the number of the semiconductor light sources, and the number of the attachment members are all at least two, and the at least two attachment members are disposed above the light source circuit boards which are arranged between the semiconductor light sources and the side edge of the light guide plate, and the at least two light source circuit boards, the at least two semiconductor light sources, and the at least two attachment members are arranged along the direction of the side edge of the light guide plate to respectively form a corresponding light source circuit board array, a corresponding semiconductor light source array, and a corresponding attachment member array.

wherein, the number of the light source circuit boards and the number of the attachment members are correspondingly one-to-one, each of the light source circuit boards has one of the attachment members, and the attachment member array and the light source circuit board array have multiple terminals, wherein, two end terminals of the light source circuit board array are aligned with two end terminals of the attachment member array respectively, and the terminals of the attachment member array except the two end terminals are staggered with the corresponding terminals of the light source circuit board array to form a staggered portion, wherein, the terminals of the adjacent two attachment members at the staggered portion is disposed between the adjacent two semiconductor light sources.

wherein, the distance between the terminals of the two adjacent attachment members at the staggered portion is less than the package length of each of the semiconductor light sources.

wherein, the distance between the two adjacent attachment members at the staggered portion ranges from 0.2 mm to 2 mm.

wherein, the staggered portion is disposed correspondingly to the sidewall of the semiconductor light source which is adjacent to the terminals of the light source circuit boards.

wherein, each of the attachment members is a silicon bar, and disposed along the sidewalls of the semiconductor light sources.

Another technical solution used to solve these technical problems in the present invention is: to provide a manufacture method for a backlight module comprising:

preparing a back frame, a light guide plate, a plurality of semiconductor light sources, a plurality of light source circuit boards, and a plurality of attachment members, wherein the number of the light source circuit boards, the number of the semiconductor light sources, and the number of the attachment members are at least two, and disposing the semiconductor light sources on the light source circuit boards;

disposing the attachment members on the light source circuit boards respectively, and then disposing the light source circuit boards with attachment members in the back frame: or disposing the light source circuit boards in the back frame, and then disposing the attachment members on the light source circuit board; and disposing the light guide plate in the back frame, wherein, part of each of the light source circuit boards is disposed between the back frame and the light guide plate, and the other part of each of the light source circuit boards is exposed outside the side edge of the light guide plate, and the at least two attachment members are disposed on the at least two light source circuit boards which are between the at least two semiconductor light sources and the side edge of the light guide plate, and the at least two light source circuit boards, the at least two semiconductor light sources, and the at least two attachment members are arranged along the side edge direction of the light guide plate to respectively form a corresponding light source circuit board array, a corresponding semiconductor light source array, and a corresponding attachment member array.

wherein, the number of the light source circuit boards and the number of the attachment members are correspondingly one-to-one, each of the light source circuit boards has one of the attachment members, and the attachment member array and the light source circuit board array have multiple terminals, wherein, two end terminals of the light source circuit board array are aligned with two end terminals of the attachment member array respectively, and the terminals of the attachment member array except the two end terminals are staggered with the corresponding terminals of the light source circuit board array to form a staggered portion, wherein, the terminals of the adjacent two attachment members at the staggered portion is disposed between the adjacent two semiconductor light sources.

wherein, the distance between the terminals of the two adjacent attachment members at the staggered portion is less than the package length of each of the semiconductor light sources.

wherein, the distance between the two adjacent attachment members at the staggered portion ranges from 0.2 mm to 2 mm.

wherein, the staggered portion is disposed correspondingly to the sidewall of the semiconductor light source which is adjacent to the terminals of the light source circuit boards.

wherein, each of the attachment members is a silicon bar, and disposed along the sidewalls of the semiconductor light sources.

In summary, in the present invention, the number of the attachment members between the light guide plate and the semiconductor light sources is at least two, and arranged along the side edge direction of the light guide plate. Each of the attachment members is shorter than the conventional art so as to easily control the attachment location, improve the accuracy of the attachment location, reduce or even avoid the generation of the bright dots of the LCD device, and simplify the process of the attachment members.

The following combines the drawings and the embodiments for detail description of the present invention.

DETAILED DESCRIPTION OF THE PREFERRED EMBODIMENT

Following combines the drawings of the embodiments of the present invention for clearly and completely describing the technical solutions of the present invention, apparently, the embodiments described are only part of the embodiments of the present invention, not all of the embodiments. Based on the embodiments, one of ordinary skill in the art can derive other embodiments. Those embodiments are still in the scope of the claims of the present invention.

Figure 1:
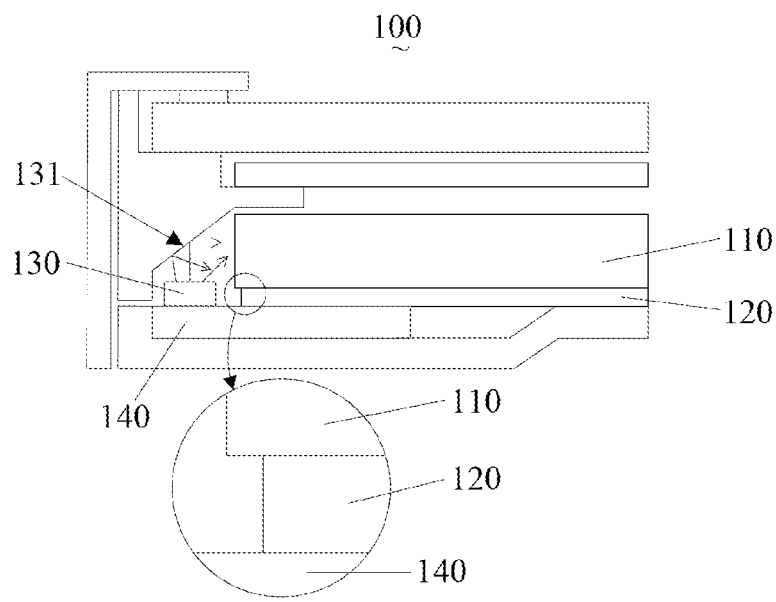
FIG. 1 is a partial cross-section schematic drawing of a backlight module of the conventional art.
Figure 2:
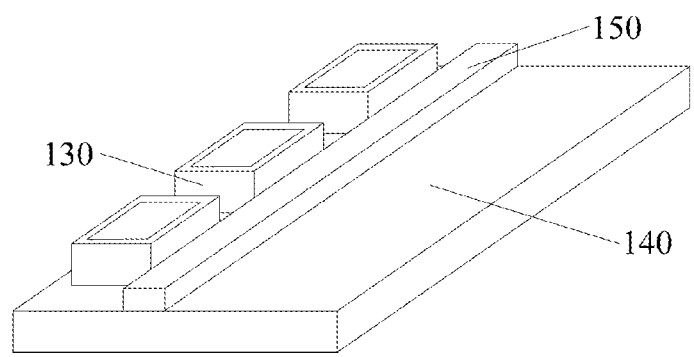
FIG. 2 is a schematic assembly drawing of the LED light sources, LED board, and the silicon bar shown in FIG. 1
Figure 3:
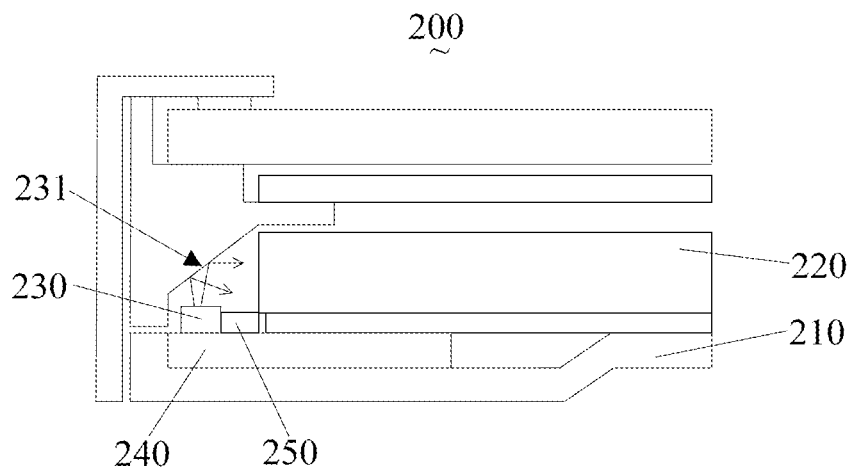
FIG. 3 is a partial cross-section schematic drawing of the backlight module of the present invention.

Please refer to FIG. 3, FIG. 3 is a partial cross-section schematic drawing of a backlight module of the present invention.

The backlight module 200 comprising a back frame 210, a light guide plate 220, a plurality of semiconductor light sources 230, a plurality of light source circuit boards 240, and a plurality of attachment members 250.

The light guide plate 220 is disposed in the back frame 210, and part of each of the light source circuit boards 240 is disposed between the back frame 210 and the light guide plate 220, and the other part of each of the light source circuit boards is exposed outside the side edge of the light guide plate 220, and the semiconductor light sources 230 are LED light sources or other semiconductor light sources.

The lights emitted from the semiconductor light sources 230 are entering the light guide plate 220 at the side surface of the light guide plate. In this embodiment, the semiconductor light sources 230 are top light type. The reflective surface 231 are disposed above the light emitting surface of the semiconductor light sources 230. The lights emitted from the semiconductor light sources 230 are entering the light guide plate 220 from the side surface of the light guide plate 220 after they are reflected by the reflective surface 231. In another embodiment, the semiconductor light sources 230 could be side light type, and the light emitting surfaces are in front of the side surface of the light guide plate 220.

The number of the light source circuit boards 240, the number of the semiconductor light source 230, and the number of the attachment members 250 are all at least two. The at least two attachment members 250 are disposed above the light source circuit boards 240 which are arranged between the semiconductor light sources 230 and the side edge of the light guide plate 220.

The at least two light source circuit boards 240, the at least two semiconductor light sources 230, and the at least two attachment members 250 are arranged along the direction of the side edge of the light guide plate 220 to respectively form a corresponding light source circuit board array, a corresponding semiconductor light source array, and a corresponding attachment members array.

In practical operation, each of the light source circuit boards 240 will attach a cover in advance. When the light source circuit boards 240 are fixed by screws, the cover can hinder and wrap the parts of the screws outside the light source circuit boards 240. The cover could be a silicone tape.

In this embodiment, the number of the light source circuit boards 240 and the number of the attachment members 250 are correspondingly one-to-one. Each of the light source circuit boards 240 has one of the attachment members 250.

The attachment member array and the light source circuit board array have multiple terminals. Two end terminals of the light source circuit board array are aligned with two end terminals of the attachment member array respectively. The terminals of the attachment member array except the two end terminals are staggered with the corresponding terminals of the light source circuit board array to form a staggered portion. The terminals of the adjacent two attachment members 250 at the staggered portion are disposed between the adjacent two semiconductor light sources 230.

Figure 4:
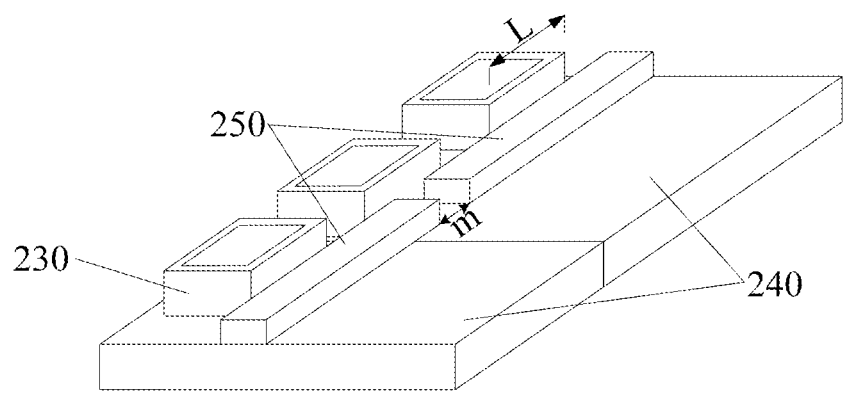
FIG. 4 is a schematic assembly drawing of the semiconductor light sources, the light source circuit boards, and the attachment members shown in FIG. 3.

For example, please also refer to FIG. 4, FIG. 4 is a schematic assembly drawing of the semiconductor light sources, the light source circuit boards, and the attachment members shown in FIG. 3. The number of the semiconductor light sources 230 is three, and the number of light source circuit boards 240 is two, and the number of the attachment members 250 is two.

The light source circuit boards 240 are jointed together. Each of the light source circuit boards 240 has one of the attachment members 250, and each of the attachment 250 could be used such as a silicon bar. The three semiconductor light sources 230 are disposed on the light source circuit boards 240. The semiconductor light sources 230 are top light emitting type, and they cannot emit lights at the sidewalls. The two attachment members 250 are disposed along the sidewalls of the semiconductor light sources 230. The length of one of the two attachment members 250 is greater than the corresponding light source circuit board 240, and the length of the other of the two attachment members 250 is less than the corresponding light source circuit board 240. The attachment member 250 which has greater length than the corresponding light source circuit board 240 is such that the part of it which exceed the corresponding light source circuit board 240 is attached on the adjacent light source circuit board 240, and is disposed relatively to one adjacent terminal of the attachment member 250 on the adjacent light source circuit board 240.

In the situation with only two light source circuit boards 240, one terminal of each of the light source circuit boards 240 is aligned with the corresponding terminal of the attachment member 250, and the other terminal of each of the attachment member 250 is staggered with the terminal of the corresponding light source circuit boards 240. In this embodiment, the staggered portion is correspond to the sidewall of the semiconductor light sources 230 which is adjacent to the terminals of light source circuit boards 240. In another embodiment, staggered portion is corresponding to a portion between two adjacent semiconductor light sources 230.

The distance m between the two adjacent attachment members 250 at the staggered portion is less than the package length L of the semiconductor light source 230. In this embodiment, m is ranged from 0.2 mm to 2 mm, like 1 mm.

Because the sidewall of the semiconductor light sources 230 could not emit lights, the lights emitted from the semiconductor light sources 230 will not pass through the staggered portion of the two attachment members 250 after reflection, thereby reducing or even avoiding the generation of the bright dots. Furthermore, use the two light source circuit boards 240 to joint together, and the number of the attachment members 250 is two. The lengths of a single light source circuit board 240 and attachment member 250 are much shorter to reduce the positioning difficulty. Besides, position deviation among the light source circuit boards 240, the attachment members 250, and the light guide plate 220 is not easy to generate.

It should be noted that when the semiconductor light sources 230 are side light emitting type, the staggered portion of the two attachment members 250 still can be corresponding to the sidewall of the semiconductor light sources 230, or the staggered portion of the two attachment members 250 does not correspond to the sidewall of the semiconductor light sources 230, and even can be located between the two adjacent semiconductor light sources 230. By setting a barrier at the staggered portion, the barrier can be deemed as the sidewall of the semiconductor light source 230 for blocking out the lights.

In another embodiment, the backlight module may not include the back frame 210 and the light guide plate 220, and only includes the semiconductor light sources 230, the light source circuit boards 240 and the attachment members 250. The number of the semiconductor light sources 230, the light source circuit boards 240, and the attachment members 250 are also at least two. The arrangement of the semiconductor light sources 230, the light source circuit boards 240, and attachment members 250 are the same as the above embodiment. It will not repeat them here.

Figure 5:
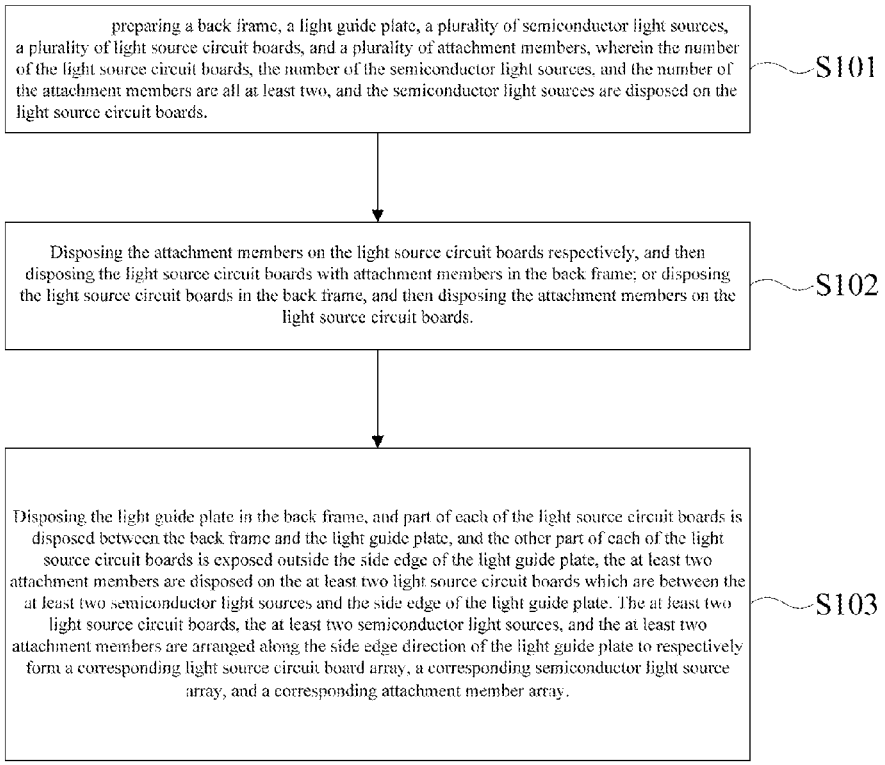
FIG. 5 is a flow chart of the manufacture method for the backlight module of the present invention.

Please refer to FIG. 5. FIG. 5 is a flow chart of the manufacture method for the backlight module of the present invention. The manufacture method includes the following steps:

Step S101: preparing a back frame, a light guide plate, a plurality of semiconductor light sources, a plurality of light source circuit boards, and a plurality of attachment members, wherein the number of the light source circuit boards, the number of the semiconductor light sources, and the number of the attachment members are all at least two, and the semiconductor light sources are disposed on the light source circuit boards.

Step S102: Disposing the attachment members on the light source circuit boards respectively, and then disposing the light source circuit boards with attachment members in the back frame; or disposing the light source circuit boards in the back frame, and then disposing the attachment members on the light source circuit boards.

Wherein, the number of the attachment members and the number of the light source circuit boards are one-to-one correspondingly. Because the attachment members are attached to the light source circuit boards before disposing the light source circuit boards on the back frame, reducing the difficulty of the attachment process, and not easy to generate deviation of the attachment position.

Step S103: Disposing the light guide plate in the back frame, and part of each of the light source circuit boards is disposed between the back frame and the light guide plate, and the other part of each of the light source circuit boards is exposed outside the side edge of the light guide plate.

The at least two attachment members are disposed on the at least two light-source circuit boards which are between the at least two semiconductor light sources and the side edge of the light guide plate. The at least two light source circuit boards, the at least two semiconductor light sources, and the at least two attachment members are arranged along the side edge direction of the light guide plate to respectively form a corresponding light source circuit board array, a corresponding semiconductor light source array, and a corresponding attachment member array.

Wherein, the attachment member array and the light source circuit board array have multiple terminals. Two end terminals of the light source circuit board array are aligned with two end terminals of the attachment member array respectively. The terminals of the attachment member array except the two end terminals are staggered with the terminals of the corresponding light source circuit board array to form a staggered portion for absorbing the dimension and assembly tolerance of the light source circuit boards.

The terminals of the adjacent two attachment members at the staggered portion is disposed between the adjacent two semiconductor light sources, or disposed at the sidewall of the semiconductor light source.

Figure 6:
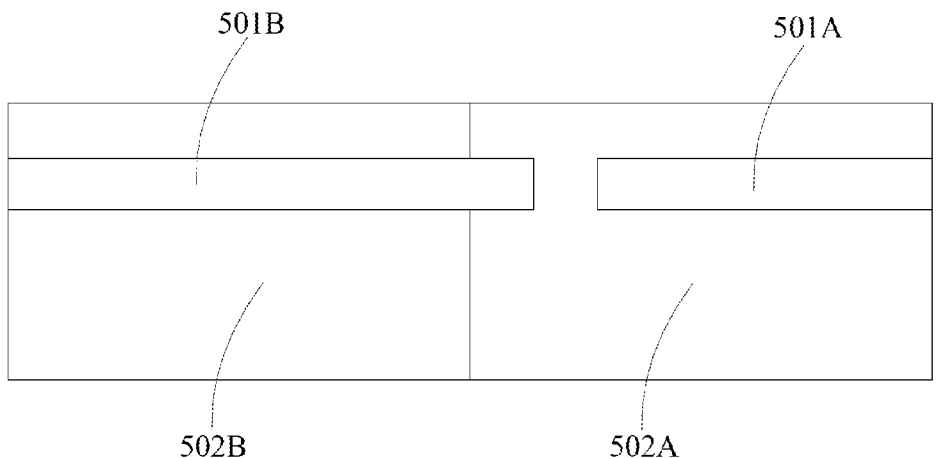
FIG. 6 is a schematic assembly drawing of another embodiment of the light boards and attachment members of the backlight module of the present invention.

The attachment order of the attachment members and light source circuit boards can be flexibly adjusted according to the manufacture process. For example, as shown in FIG. 6, FIG. 6 is a schematic assembly drawing of the light source circuit boards and attachment members of the backlight module of the present invention. In the case of two attachment members and two light source circuit boards, firstly, a silicon bar 501A is attached to a light source circuit board 502A, and the silicon bar 501A is shorter than the light source circuit board 502A. The silicon bar 501A has two terminals and the light source circuit board 502A also has two terminals. One of the terminals of the silicon bar 501A is aligned with one of the terminals of the light source circuit board 502A; Then, disposing the light source circuit board 502A in the back frame. Secondarily, a silicon bar 501B is attached to a light source circuit board 502B, and the silicon bar 501B is longer than the light source circuit board 502B. The silicon bar 501B has two terminals and the light source circuit board 502B also has two terminals. One of the terminals of the silicon bar 501B is aligned with one of the terminals of the light source circuit board 502B. Then, also disposing the light source circuit board 502B in the back frame, and aligning the light source circuit board 502A with the light source circuit board 502B. The part of the silicon bar 501B which exceeds the light source circuit board 502B is attached to the shorter area of the silicon bar 501A such that the terminal of the silicon bar (the attachment member) 501A which is shorter than the light source circuit board 502A and the terminal of the silicon bar 501B (the attachment member) which is longer than the light source circuit board 502B are staggered.

Comparing to the proceeding case, it can also dispose the light source circuit board 502A and the light source circuit board 502B in the back frame first, and then attaching the silicon bar 501A and the silicon bar 501B to the light source circuit board 502A and the light source circuit board 502B respectively. The attachment order of the attachment members and the light source circuit boards is not limited in the present invention.

By the proceeding method, the number of the attachment members between the light guide plate and the semiconductor light sources is at least two, and the attachment members are arranged along the side edge direction of the light guide plate. The length of each of the attachment members is shorter than those of the prior art so as to easily control the attachment position, improve the accuracy of the attachment position, even avoid the generation of the bright dots of the LCD device, and simplify attachment process of the attachment members.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A backlight module comprising:
   a back frame;
   a light guide plate disposed in the back frame;
   a plurality of semiconductor light sources;
   a plurality of light source circuit boards, wherein part of each of the light source circuit boards is disposed between the back frame and the light guide plate, and the other part of each of the light source circuit boards is exposed outside the side edge of the light guide plate, and each of the semiconductor light sources is disposed on the light source circuit boards which are exposed outside the side edge of the light guide plate, and the lights emitted from the semiconductor light sources enter the light guide plate at the side surface of the light guide plate; and
   a plurality of attachment members, wherein the number of the light source circuit boards, the number of the semiconductor light sources, and the number of the attachment members are all at least two, and the at least two attachment members are disposed above the light source circuit boards which are arranged between the semiconductor light sources and the side edge of the light guide plate, and the at least two light source circuit boards, the at least two semiconductor light sources, and the at least two attachment members are arranged along the direction of the side edge of the light guide plate to respectively form a corresponding light source circuit board array, a corresponding semiconductor light source array, and a corresponding attachment member array;

wherein, the number of the light source circuit boards and the number of the attachment members are correspondingly one-to-one, each of the light source circuit boards has one of the attachment members, and the attachment member array and the light source circuit board array have multiple terminals, wherein, two end terminals of the light source circuit board array are aligned with two end terminals of the attachment member array respectively, and the terminals of the attachment member array except the two end terminals are staggered with the corresponding terminals of the light source circuit board array to form a staggered portion, wherein, the terminals of the adjacent two attachment members at the staggered portion are disposed between the adjacent two semiconductor light sources, and the distance between the terminals of the two adjacent attachment members at the staggered portion is less than the package length of each of the semiconductor light sources, and the staggered portion is disposed correspondingly to the sidewall of the semiconductor light source which is adjacent to the terminals of the light source circuit boards.

2. The backlight module according to claim 1, wherein, the distance between the two adjacent attachment members at the staggered portion ranges from 0.2 mm to 2 mm.

3. The backlight module according to claim 1, wherein, each of the attachment members is a silicon bar, and disposed along the sidewalls of the semiconductor light sources.

4. An LCD device comprising:
an LCD panel; and
a backlight module, wherein, the backlight module comprises:
a back frame;
a light guide plate disposed in the back frame;
a plurality of semiconductor light sources;
a plurality of light source circuit boards, wherein part of each of the light source circuit boards is disposed between the back frame and the light guide plate, and the other part of each of the light source circuit boards is exposed outside the side edge of the light guide plate, and each of the semiconductor light sources is disposed on the light source circuit boards which are exposed outside the side edge of the light guide plate, and the lights emitted from the semiconductor light sources enter the light guide plate at the side surface of the light guide plate; and
a plurality of attachment members, wherein the number of the light source circuit boards, the number of the semiconductor light sources, and the number of the attachment members are all at least two, and the at least two attachment members are disposed above the light source circuit boards which are arranged between the semiconductor light sources and the side edge of the light guide plate, and the at least two light source circuit boards, the at least two semiconductor light sources, and the at least two attachment members are arranged along the direction of the side edge of the light guide plate to respectively form a corresponding light source circuit board array, a corresponding semiconductor light source array, and a corresponding attachment member array;

wherein, the number of the light source circuit boards and the number of the attachment members are correspondingly one-to-one, each of the light source circuit boards has one of the attachment members, and the attachment member array and the light source circuit board array have multiple terminals, wherein, two end terminals of the light source circuit board array are aligned with two end terminals of the attachment member array respectively, and the terminals of the attachment member array except the two end terminals are staggered with the corresponding terminals of the light source circuit board array to form a staggered portion, wherein, the terminals of the adjacent two attachment members at the staggered portion are disposed between the adjacent two semiconductor light sources.

5. The LCD device according to claim 4, wherein, the distance between the terminals of the two adjacent attachment members at the staggered portion is less than the package length of each of the semiconductor light sources.

6. The LCD device according to claim 5, wherein, the distance between the two adjacent attachment members at the staggered portion ranges from 0.2 mm to 2 mm.

7. The LCD device according to claim 4, wherein, the staggered portion is disposed correspondingly to the sidewall of the semiconductor light source which is adjacent to the terminals of the light source circuit boards.

8. The LCD device according to claim 4, wherein, each of the attachment members is a silicon bar, and disposed along the sidewalls of the semiconductor light sources.

9. A manufacturing method for a backlight module comprising:
preparing a back frame, a light guide plate, a plurality of semiconductor light sources, a plurality of light source circuit boards, and a plurality of attachment members, wherein the number of the light source circuit boards, the number of the semiconductor light sources, and the number of the attachment members are at least two, and disposing the semiconductor light sources on the light source circuit boards;
disposing the attachment members on the light source circuit boards respectively, and then disposing the light source circuit boards with attachment members in the back frame; or disposing the light source circuit boards in the back frame, and then disposing the attachment members on the light source circuit board; and
disposing the light guide plate in the back frame, wherein, part of each of the light source circuit boards is disposed between the back frame and the light guide plate, and the other part of each of the light source circuit boards is exposed outside the side edge of the light guide plate, and the at least two attachment members are disposed on the at least two light source circuit boards which are between the at least two semiconductor light sources and the side edge of the light guide plate, and the at least two light source circuit boards, the at least two semiconductor light sources, and the at least two attachment members are arranged along the side edge direction of the light guide plate to respectively form a corresponding light source circuit board array, a corresponding semiconductor light source array, and a corresponding attachment member array;
wherein, the number of the light source circuit boards and the number of the attachment members are correspondingly one-to-one, each of the light source circuit boards has one of the attachment members, and the attachment member array and the light source circuit board array have multiple terminals, wherein, two end terminals of the light source circuit board array are aligned with two end terminals of the attachment member array respectively, and the terminals of the attachment member array except the two end terminals are staggered with the corresponding terminals of the light source circuit board array to form a staggered portion, wherein, the terminals of the adjacent two attachment members at the staggered portion are disposed between the adjacent two semiconductor light sources.

10. The manufacturing method according to claim 9, wherein, the distance between the terminals of the two adjacent attachment members at the staggered portion is less than the package length of each of the semiconductor light sources.

11. The manufacturing method according to claim 10, wherein, the distance between the two adjacent attachment members at the staggered portion ranges from 0.2 mm to 2 mm.

12. The manufacturing method according to claim 9, wherein, the staggered portion is disposed correspondingly to the sidewall of the semiconductor light source which is adjacent to the terminals of the light source circuit boards.

13. The manufacturing method according to claim 9, wherein, each of the attachment members is a silicon bar, and disposed along the sidewalls of the semiconductor light sources.

* * * * *